United States Patent

[11] 3,597,736

| [72] | Inventor | Robert H. Best |
| | | Greensboro, N.C. |
| [21] | Appl. No. | 746,961 |
| [22] | Filed | July 23, 1968 |
| [45] | Patented | Aug. 3, 1971 |
| [73] | Assignee | Burlington Industries, Inc. |
| | | Greensboro, N.C. |

[54] PLURAL STATION LOOM DATA COLLECTION SYSTEM
12 Claims, 2 Drawing Figs.

[52] U.S. Cl. ................................................. 340/163,
340/147, 340/150, 340/151, 340/152, 340/223, 340/415
[51] Int. Cl. ........................................... H04g 11/00
[50] Field of Search ........................................ 340/150,
151, 152, 147 P, 163, 415, 223

[56] References Cited
UNITED STATES PATENTS

| 3,264,613 | 8/1966 | Stolle | 340/147 |
| 3,372,379 | 3/1968 | Collom | 340/172.5 |
| 3,373,773 | 3/1968 | Balentine | 340/147 UX |
| 3,384,874 | 5/1968 | Morley | 340/147 UX |
| 3,394,349 | 7/1968 | Day | 340/147 UX |
| 3,396,379 | 8/1968 | Chapman | 340/347 |
| 3,414,905 | 12/1968 | O'Brien | 346/33 |
| 3,445,813 | 5/1969 | Price | 340/150 |
| 2,731,623 | 1/1956 | Kendall | 340/147 UX |
| 2,794,179 | 5/1957 | Sibley | 340/147 UX |
| 2,883,647 | 4/1959 | Leeds | 340/147 UX |
| 2,907,982 | 10/1959 | Barker | 340/147 UX |
| 2,918,654 | 12/1959 | Hillyer | 340/147 UX |
| 2,955,278 | 10/1960 | Sibley | 340/147 UX |
| 3,045,210 | 7/1962 | Langley | 340/147 UX |
| 3,135,299 | 6/1964 | Abelsma | 340/147 UX |
| 3,184,725 | 5/1965 | Siegel | 340/147 UX |
| 3,214,734 | 10/1965 | Whitehead | 340/147 UX |
| 3,226,726 | 12/1965 | Adams | 340/147 UX |

*Primary Examiner*—Harold I. Pitts
*Attorney*—Cushman, Darby & Cushman

ABSTRACT: The invention relates to an information-conveying system for communicating conditions on a number of textile machines to a computer or recorder whereby the machines themselves notify the computer or recorder whenever a trigger condition, such as stoppage, occurs and whenever it ends. In one embodiment each of a number of looms encodes its address onto a number of address lines when it stops and communicates the cause of stoppage to the computer or recorder on a number of return lines. Upon restarting the address is once again encoded onto the address lines. A manual encoder can encode an information signal onto the address lines or onto return lines following the address encoded when the machine restarts.

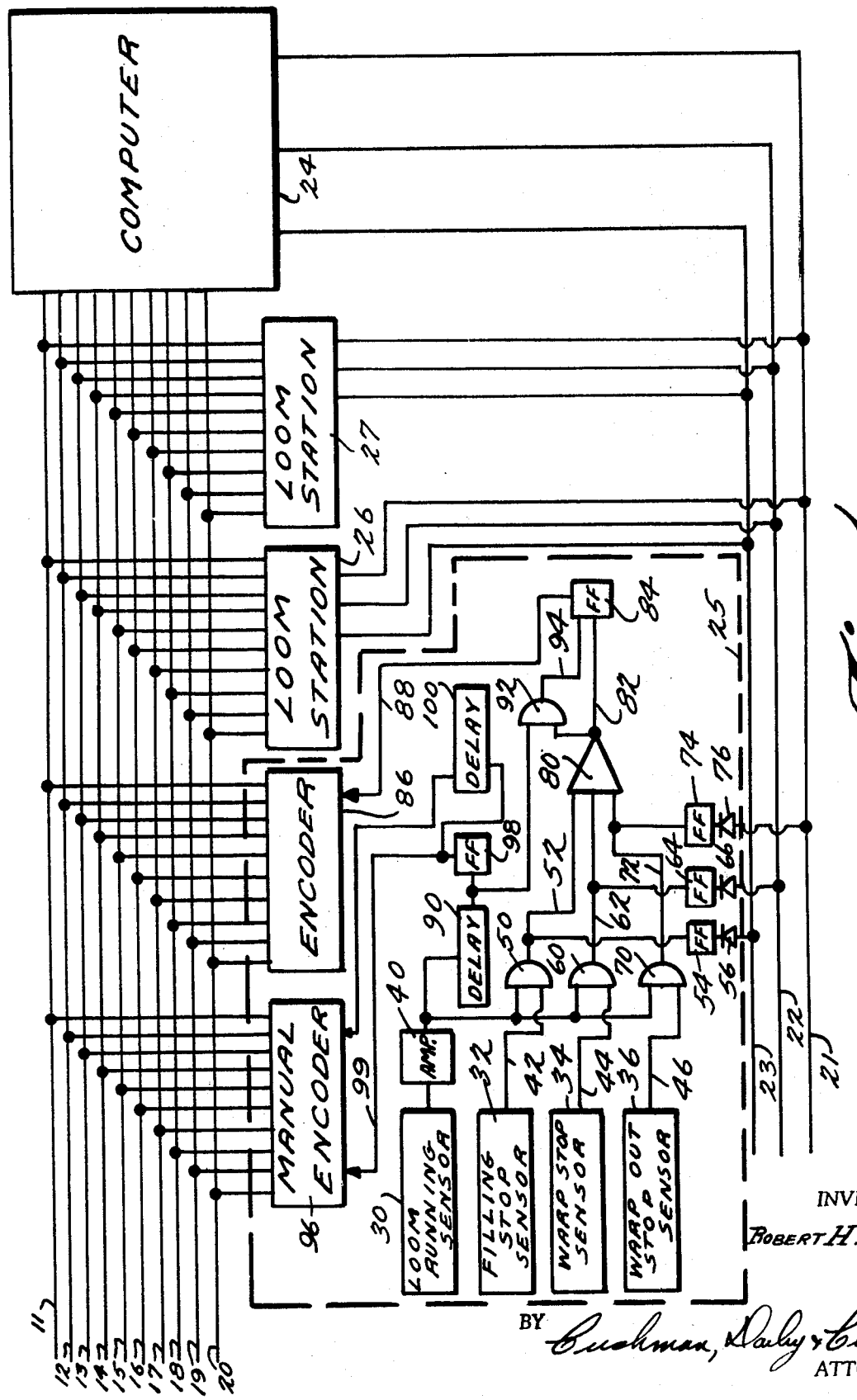

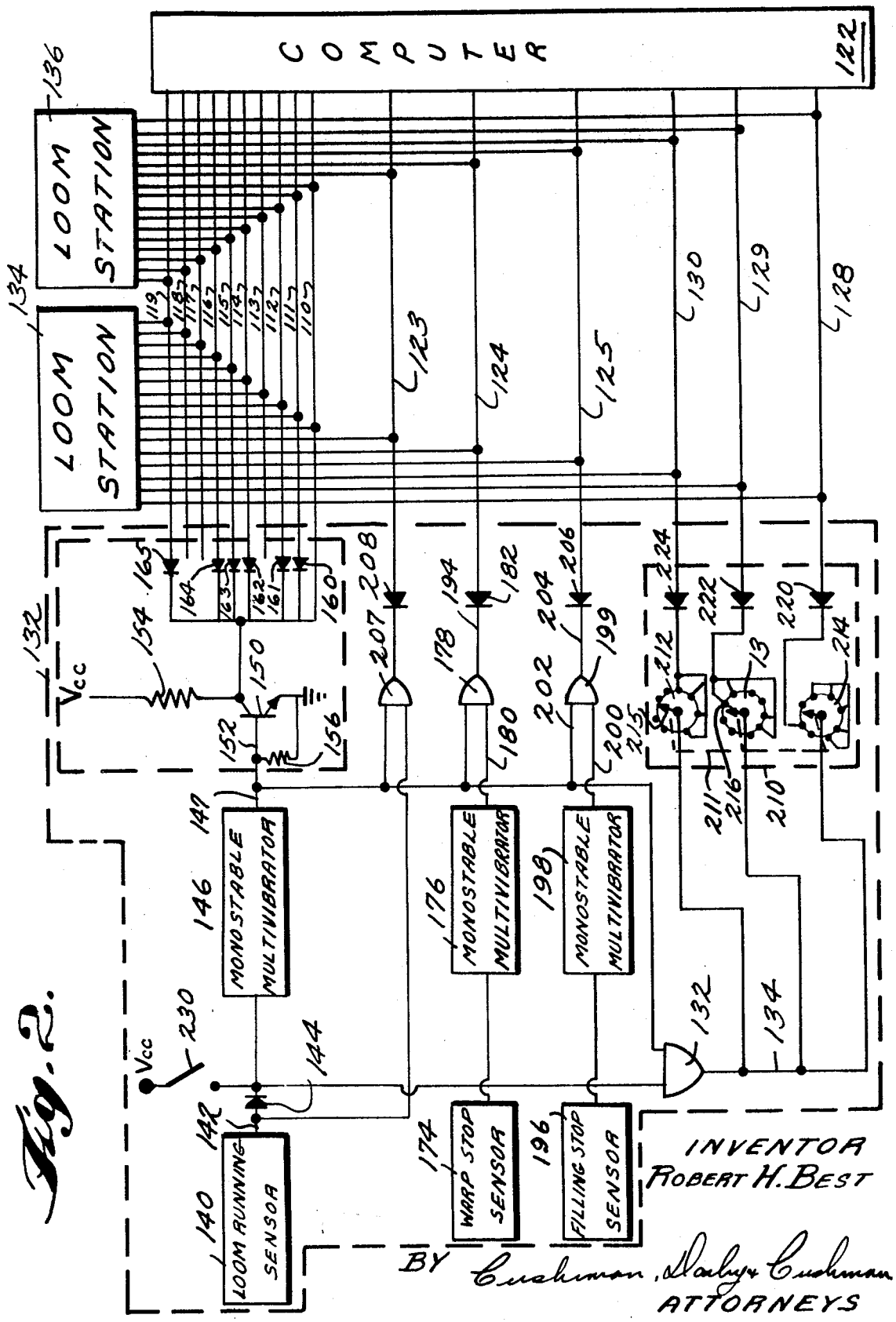

3,597,736

PLURAL STATION LOOM DATA COLLECTION SYSTEM

DESCRIPTION OF PRIOR ART AND SUMMARY OF THE INVENTION

This invention relates to an information-conveying system for conveying information relating to operating conditions on a number of textile machines to a computer or recorder whereby the textile machines themselves signal the computer or recorder whenever a stoppage occurs and again whenever the machine is restored to operation.

In many factories and particularly in textile mills where a large number of independent machines are operating, it is desirable to have current information available which identifies the machines which are operating and the ones which are not. It is also desirable to possess current information as to the causes of stoppage of those machines not in operation so that the past and future output of each machine individually and of all the machines collectively can be intelligently predicted.

In the environment of a textile mill this information is particularly important since the pay of each machine operator is a function of the material output and hence of the running time of the machine he operates. In addition, for looms, an accurate and updated prediction as to when a warp beam will have to be replaced and how much cloth and of what type is being produced allows the mill to be managed with maximum efficiency.

In the past, pick counters have been associated with each individual machine to record the number of loom-running cycles. However, such counters must be manually and periodically checked and cannot provide an immediate indication of the number of machines operating and the causes of stoppages. Other past systems have interrogated electrical sensing devices on the looms by sending a signal to a loom station to cause them to respond by supplying data on a number of return lines, each of which connects just one textile machine to the interrogating system. One such system is described in the Adams et al. U.S. Pat. No. 3,226,726. Other systems have utilized an information-conveying system whereby each of the machines is connected to a number of interrogation and return lines so that the address signals and the information from all of the looms is effectively carried on the same lines and the recorder or computer depends upon the knowledge of which loom was chosen to determine the source of the information on the return lines. One such interrogation system is described in U.S. Pat application Ser. No. 746,962 filed concurrently herewith.

In contrast, the present invention contemplates a system whereby the machines themselves notify the computer or recorder at the time stoppage occurs rather than utilizing an interrogator to sequentially and constantly interrogate each of the looms. Since most of the machines at any given time are operating properly, this sequential interrogation is inefficient. The present invention eliminates this routine checking of normal operation resulting in a vast savings in computer time and an increase in efficiency, since only abnormal conditions such as stoppages and only nonoperating machines are dealt with. If a computer is used to handle the information on stoppages, using the "process interrupt system" the time saved can be used to process other data. Alternatively, some other type of recorders such as magnetic tapes can be used to record the stoppage signals sent by the loom stations and the computer used to occasionally digest the information and rework it as desired.

In the embodiments described below in detail each of the loom stations is connected to the computer and to all of the other loom stations via a number of address lines and a number of return lines. When a stoppage occurs the loom which has stopped applies its address to the address lines to identify itself and then communicates the cause of the stoppage by means of one or a number of signals sent on one or a number of the return or information lines. The stoppage then acts as a trigger condition causing the loom station to communicate with the computer or recorder. When the loom resumes operating, the address signal is once again returned to the computer or other recorder without any accompanying signal on the return lines or with a starting signal on one return line so that the computer or recorder can recognize that the stoppage is over.

In addition, this embodiment includes apparatus for manually encoding a signal onto the address lines in one embodiment and onto separate coding lines in another embodiment which follows the second address signal indicating that the loom is again operating. This manual signal can be encoded by the repairman or loom operator to conveyor further information on the causes of the stoppage.

Other objects and purposes of the invention will become clear after reading the following detailed description of the drawings.

BRIEF DESCRIPTION OF THE DRAWING

FIG. 1 shows one system for conveying information from a plurality of textile machines to a recorder whereby the machines notify the computer when a stop occurs.

FIG. 2 shows an alternative system for conveying information from a plurality of textile machines to a recorder whereby the machines notify the computer when a stop occurs.

DETAILED DESCRIPTION OF THE DRAWING

Reference is now made to FIG. 1 which discloses a system for monitoring conditions on a number of textile machines, such as looms, whereby each loom notifies the computer or recorder when it stops and informs the computer as to the reason for the stoppage. Ten address lines 11—20 inclusive connect the three loom stations 25, 26 and 27 to the computer 24. Each of these lines 11—20 connects to all of the loom stations in the system and it is along these 10 lines that signals are sent identifying looms which stop. In this embodiment, each of the loom stations is represented by a binary number and each of the 10 address lines carries a digit of that number so that, with 10 lines, 1,023 different looms or textile machines can be handled. Of course the system can be simply expanded by adding additional address lines, each line added roughly doubling the number of looms which can be included.

Information relating to the cause of loom stoppage is sent to the computer on return lines 21, 22 and 23. Each of these lines connects to all of the loom stations and to the computer. In this embodiment, each of these return lines carries a single bilevel signal—line 21 assuming a certain potential if a warp out stop occurs, line 22 if a filling stop occurs and line 23 if a warp stop occurs. Although these three loom conditions represent the vast majority of causes of loom stoppage, they are merely representative of the many conditions which can be sensed. This system is especially flexible in that each additional condition sensed merely requires the addition of an additional return line.

The 10 address lines and the three return lines, together with any other lines such as may be added to convey information to the computer 24 or to increase the number of looms in the system, such as the coding lines shown in FIG. 2, can be grouped in a single multiconductor cable which then connects to each of the loom stations including stations 25, 26 and 27. Since the electrical environment of textile machines can be very noisy, shielding the cable is desirable so that signals can be sent without substantial distortion.

Each of the loom stations shown in FIG. 1 responds to the stoppage of the loom with which it is associated by applying the address of the stopped loom to the address lines 11—20 as well as supplying further information on the cause of the stoppage to return lines 21—23. When the stoppage has ended the loom station again supplies its address to the address lines 11—20 to indicate that stoppage has ended.

The operation of loom station 25 will now be described in detail. The loom-running sensor 30, which can, for example, operate by sensing the motion of a gear which rotates only during operation, produces an electric signal which indicates whether the loom is running or not. A sensor which operates by producing an electrical signal which is a function of the distance between a probe and the gear and thus produces a changing electrical signal when the gear is in motion is especially useful. The changing signal can be converted to a bilevel signal by rectifying the changing signal and applying it to a switching circuit so that a first output level results when the gear is turning and a second when it is not. Since almost all textile machines and indeed all similar machines have such a gear, such a sensor can be used with a variety of machines. Furthermore, since the sensor responds only to the gear movement and is normally mounted quite near the gear, it cannot be easily fooled, so that it is virtually impossible to delude the computer 24 into thinking a loom is running when it is not. Of course, other means of sensing a running condition such as a switch or combination of switches, which are closed or opened only in a run condition can be used.

Similarly, filling stop sensor 32, warp stop sensor 34 and warp out sensor 36 produce suitable electrical signals when these conditions are sensed. These three sensors along with the loom-running sensor 30 are more fully described in the aforementioned application, Ser. No. 746,962 filed concurrently herewith. For the purposes of explanation it will be assumed that the electrical signals produced by these four sensors are bilevel, but no such limitation is intended nor required.

The filling stop sensor 32 may, for example, be a switch having an open and a closed position inserted in a metal block which is mounted on the loom. A magnetic member is then attached to a movable part of the loom so that when the loom is stopped for filling the magnetic member is automatically positioned so as to cause the switch to close. This arrangement is fully described in connection with U.S. Pat. application, Ser. No. 615,178 entitled "Loom Stop Counter" filed Feb. 10, 1967. In some applications, a mercury switch mounted on the knockoff arm may be used, making contact when the filling, yarn breaks causing the arm to move and to tilt the switch.

The warp stop sensor 34 may, for example, include a plurality of drop wires each of which is attached to a warp thread so that when the warp thread breaks the drop wire falls, completing a circuit which signals that a warp stop is occurring and causes the machine to cease operating by completing a path through a relay which then opens a switch depriving the loom of electrical energy.

The warp out sensor may, for example, include a manually thrown switch which the operator closes. The switch may be of the double-throw single pole variety so that closing it also completes a circuit through the relay which opens the power switch during a warp stop, preventing the machine from operating until the warp out manual switch has been returned to its initial position.

An amplifier circuit 40 serves to amplify the output of the sensor 30 and to produce a first output state when the sensor 30 detects motion and a second output state when it does not. Similarly, lines 42, 44 and 46 assume a first output state when, respectively, a filling stop is in progress, a warp stop is occurring and a warp out stop is occurring. The output of the amplifier 40 is then applied to a logic gate 50 along with the signal on line 42 which indicates whether a filling stop is in progress, so that the logic gate 50 is enabled and produces a signal on line 52 only when the filling stop sensor detects a filling stop and the loom-running sensor 30 indicates the loom is not operating. The output of gate 50 on line 52 is then applied to a monostable flip-flop 54 which then produces a short pulse which is passed through the diode 56 and return line 23 to be carried to the computer 24. A short pulse on line 23 then indicates that a filling stop has occurred.

Similarly, warp stop sensor 34 applies a suitable electrical signal to line 44 when this condition is sensed. The output on line 44 is then conveyed to another logic gate 60 along with the output of the amplifier 40 so that an output signal on line 62 results only when gate 60 is enabled, i.e. only when the loom-running sensor 30 fails to detect that the loom is running and the warp stop sensor 34 detects a warp stop. The signal on line 52 is then applied to another monostable flip-flop 64 which then produces a short pulse which is applied to the return line 22 via diode 66.

In addition, warp out stops are sensed when warp out sensor 36 produces an output signal on 46. The signal on line 46 is then applied as an input to logic gate 70 along with the output of amplifier 40, so that the output of logic gate 70 on line 72 causes monostable flip-flop 74 to produce a short pulse which is conveyed to line 22 and hence to the computer 24 via diode 76 whenever a warp out stop is detected and the loom is detected as not operating.

The respective outputs of logic gates 50, 60 and 70 are then applied to another logic gate 80 which produces an output signal if any of the three gates 50, 60, or 70 are enabled so that the gate 80 is enabled if any of the three stoppage conditions are sensed and the loom is not operating. The output of the logic gate 80 on line 82 is then applied to another monostable flip-flop 84 which produces a short pulse if the gate 80 is enabled. This pulse is carried to the encoder 86 on line 88. The encoder 86 then applies a potential to some of the address lines 11—20 to create a binary pattern which identifies the loom station sending the information. The computer 24 or manual operator then receives the address of the stopped loom on lines 11—20 as well as the reason for the stoppage on lines 21—23.

After the loom is back in operation the logic gates 50, 60, and 70 will be disabled as will the logic gate 80. The output of amplifier 40 is also applied through a delay network 90 to a logic gate 92 along with the output of the logic gate 80. This gate 92 is enabled only when the logic gate 80 is disabled and when the amplifier 40 indicates that the loom is not operating. These two conditions are satisfied briefly after the loom starts and until the signal from amplifier 40 passes through the delay circuit 90. When these two conditions are satisfied, then the output of the logic gate 92 on line 94 causes monostable flip-flop 84 to produce another short pulse on line 88 to cause the encoder 86 to once again apply the pattern of pulses on lines 11—20 which identify the loom.

Should the cause of loom stoppage be other than filling stop, warp stop or warp out stop, no signals will be sent on lines 21—23 and the address of the loom will be sent on lines 11—20 since after a short delay gate 92 will be enabled causing flip-flop 84 to produce a pulse thereby causing encoder 86 to encode the address. However, no signal will be received at the end of such a stop and this information will have to be sent by some other means such as the manual encoder 96. The computer 24 or human operator can recognize that an unaccompanied address from a loom which is running indicates a mechanical failure.

The computer 24 or manual operator knowing that the stopped loom is not operating can assume from receiving the address of the stopped loom a second time that the loom is now operating. The computer 24 will, of course, be adapted to assume that the loom remains stopped until the loom number is received without corresponding information on lines 21, 22 and 23.

The system is also adapted to supply manual stop information of the type which the loom fixer or other personnel might desire to communicate relating to the type of stop or other information. This information would be in the form of a coded signal directly following the address which the loom sends upon restarting and would be entered manually on encoder 96 while the loom is stopped. For example, in the event of mechanical failure this information can be used to indicate to the computer that the loom is once again operating. When the loom starts again causing the address of the loom to be sent on lines 11—20 the output of the delay circuit 90 also triggers a monostable flip-flop 98 which after a short delay, produces a pulse, which is carried to encoder 96 on line 99 causing encoder 96 to apply the coded signal to lines 11—20 following the address signals which have been applied by encoder 86.

Delay circuit 100 then serves to clear the manual encoder 96. The computer 24 or manual operator will know that such information can follow an address and will look for it. Since loom addresses will be sent relatively infrequently, little confusion should arise between addresses of looms and manually encoded information.

Since it is highly improbable that more than one loom will attempt to notify the computer 24 at the same time, there is not necessity to deal with the possibility of attempted simultaneous information transfer on the address or return lines from more than one loom. The information will be conveyed in a few microseconds so that any confusion will occur very infrequently. However, should it be desirable to eliminate any possible confusion, information-retaining means can be added either within the respective loom station, or within the computer 24 to hold information until the respective lines are clear.

Reference is now made to FIG. 2 which describes an alternative embodiment of the invention whereby each of the loom stations signals the computer only in the event that the loom with which it is associated stops. As in the embodiment shown in FIG. 1, and described above, the computer or manual operator is a passive element in this system rather than playing an active role, sequentially interrogating the looms as in the system described in the aforementioned application, Ser. No. 746,962 filed concurrently herewith. As pointed out above, a passive or "process interrupt" system results in a considerable amount of savings in computer time since, during any given period, far more looms will ordinarily be running than not.

In this embodiment, as in the embodiment shown in FIG. 1, there is no real necessity to deal with the possibility of simultaneous notification by more than one loom on the same respective lines since the information as to stoppage can in fact be conveyed in a very short span of time compared to the average time between stoppages so that it is possible to use the same common lines for all of the loom stations without frequent confusion due to attempted simultaneous transfer of information.

In the embodiment shown in FIG. 2, address lines 410—419 carry a binary address signal in the same manner as the address lines 11—20 in FIG. 1. However, in contrast to the system described in the aforementioned application, Ser. No. 746,962 filed concurrently herewith whereby an address signal carried on similar lines serves to query the station so identified, requiring an answer as to whether the loom has stopped, lines 110—119 do not carry the address of a stopped loom to the computer 112 in response to interrogation by the computer 122, but rather in response to the stoppage itself.

As in the embodiment shown and described in connection with FIG. 1, the address lines 110—119 carry the address of the stopped loom and reply lines 123, 124 and 125 carry specific information relating to the cause of the stoppage. In addition, code lines 128, 129 and 130 carry coded information which may be manually entered by the operator, for example, to notify the computer 122 that he has taken some affirmative action or has recognized some special condition which needs to be dealt with in a special manner. Although only three loom stations, namely loom stations 132, 134 and 136, are shown connected to the computer 122, the system obviously can be used with many more looms by connecting additional loom stations to the respective address, reply and code lines in the same manner as shown.

The operation of a loom station 132 will now be discussed in detail. The loom-running sensor label 140 produces an electrical signal which indicates whether the loom is running or not. For this embodiment, it will be assumed that the signal is simply a bilevel signal with one level indicating that the loom is running and the other that the loom is stopped. As set forth in connection with FIG. 1, the sensor, 140, can operate by sensing the motion of a gear on the loom which rotates only during operation. Alternatively, any suitable system for sensing whether a loom is in fact operating or not and producing a suitable electrical signal can be used, for example a relay connecting a potential to the line 142, such as the 12-volt circuit of the loom, while the loom is running and disconnecting it whenever the loom ceases operating, or vice versa.

The electrical signal indicating whether or not the loom is operating is then fed on line 142 via diode 144 to a monostable multivibrator 146 which is of the type which responds to a change in the level of the input signal level, either on to off or off to on, with an output pulse, typically of a few microseconds. Each stopping and starting of the loom associated with loom station 132 results in such a change in the signal level applied to multivibrator 146 so that multivibrator 146 responds to each starting and stopping by producing a single output pulse of predetermined height and duration of line 147 regardless of the magnitude or duration of the signal input to multivibrator 146. Multivibrators of this type, such as multivibrator 146, are, of course, well known in the art and need not be described in detail.

The output of multivibrator 146 is then applied to the base of a transistor 150 on line 152. The collector of transistor 150 is connected to a positive source of potential V via a resistor 154 while another resistor 156 connects the base and grounded emitter of the transistor 150. The transistor 150 and the values of resistors 154 and 156 are chosen so that the transistor 150 is driven into conduction during the time the pulse from multivibrator 146 is received at its base and remains in a state of nonconduction during the absence of such a pulse.

Whenever the transistor 150 begins to conducts, the collector of transistor 150 shifts from a potential of $V_{cc}$ to approximately ground thereby changing the potential of the address lines connected to that collector so that a pulse is sent down those lines. The pattern of pulses on some lines and none on others, representing the address of a given loom station, is then determined by which of the address lines are connected to the collector of transistor 150 and which are not so that, when the transistor 150 begins to conduct, a signal which can either indicate a binary zero or one is sent down those lines that are so connected and no signal which represents the opposite digit on those lines which are not so connected. Thus for loom station 132, lines 111, 112, 114, 115 and 119 are connected to the collector of transistor 150 via isolating diodes of 160, 161, 162, 163, 164 and 165. If the presence of a signal on a given line is interpreted as a binary one, the address of loom station 132 reading from bottom to top would be 0110111001 or 441 expressed in base 10. This station address is then impressed on address lines 110 to 119 as described, whenever the loom sensor 140 senses that the loom has either stopped or started.

The apparatus shown in FIG. 2 is also capable of indicating to the computer whether the cause of stoppage is due to a warp stop or a filling stop. The warp stop indication may also include a warp out stop or a separate sensor such as shown in FIG. 1 may be added if desirable.

If a warp stop occurs, the warp stop sensor 174 produces an electrical signal which is suitable to trigger another monostable multivibrator 176 which then responds by producing a pulse of a given amplitude and duration which is then conveyed to the logic gate 178 via line 180 along with the output of multivibrator 146 on line 181. However, multivibrator 176 only responds to the change in signal indicating a warp stop and does not produce a pulse when the warp condition ceases to exits. Logic gate 178, which may be a NAND gate, responds to the temporal coincidence of the pulses from multivibrators 146 and 176 with a suitable signal indicating that a warp stop has occurred. Since it is possible to sense a warp stop 20 to 300 milliseconds before the loom stops depending on the position of the loom when the warp breakage occurs, with the result that the pulse from multivibrator 176 may occur before the pulse from multivibrator 146, it is desirable that the pulse produced by multivibrator 176 be of substantially longer duration than the signal produced by multivibrator 146. A duration of about 0.5. second has been found satisfactory for the pulse produced by multivibrator 276. In the embodiment shown in FIG. 2, NAND gate 178 responds to the coincidental presence of both pulses by grounding line 124 via diode 182. Line 124 is connected to the computer 122 so that the computer 122 upon receiving, at about the same time, an appropriate signal on line 124 and an address of a particular loom station can assume that that station is undergoing a warp stop.

Similarly, filling stop sensor 196 produces a suitable electrical signal to trigger monostable multivibrator 198, producing an electrical pulse of a given pulse and duration, whenever a filling stop is sensed. This pulse from multivibrator 198 is then conveyed to logic NAND gate 199 on line 200 at approximately the same time that the pulse output of multivibrator 146 is also applied to logic gate 199 on line 202. Since a filling stop may be sensed somewhat before a stop is, it is also desirable that the duration of the pulse produced by multivibrator 198 exceed substantially the duration of the pulse produced by multivibrator 146. The output of logic gate 199 on line 204 is then applied to the line 125 and then to the computer 122 via isolating diodes 206. In the embodiment shown in FIG. 2, NAND gate 199 then responds to the coincidental presence of the two pulses by producing a suitable signal indicating that a filling stop is occurring, for example by grounding line 125. From the receipt of a loom address and a signal on line 125 at roughly the same time, the computer recognizes that a filling stop is occurring on the identified loom.

Whenever the loom restarts, the loom sensor 140 once again shifts its output signal level and line 142 once again causing the multivibrator 146 to produce another pulse identical to the pulse produced when the loom stopped. The transistor 150 once again enters a state of conduction which continues as long as the pulse persists, grounding the appropriate lines among the address lines 110—119 so that a binary signal pattern representing the address of loom station 132 is once again conveyed to the computer 122. Since the computer 122 is aware that the loom is stopped, it recognizes that the receipt of this further signal means that the loom so identified is once again running normally, and the computer can be programmed to determine "down time" by noting the time difference between the receipt of the two address signals.

Although not necessary, it is desirable that the signal indicating a start and the signal indicating a stop be different so that the computer 122 can correct itself in the event one signal is missed. In this embodiment, this difference is provided by the presence of a signal on line 123 only when the loom starts. This is accomplished by connecting the output of the multivibrator 146 and of the sensor 140 to a logic gate 207 which responds with an output signal only when the output pulse from multivibrator 146 is received coincidentally with an output of sensor 140 indicating that the loom is running. These two signals are produced at the same time only after the loom restarts and not upon stopping so that a signal applied on line 123 via diode 208 gives the computer reassurance that the loom identified from the pattern on address lines 110—119 has restarted.

After the loom has stopped, it is possible to encode information onto the manual encoder 210 which indicates to the computer either that certain action had been taken or that a certain condition is present. This encoder may be used to convey to the computer a cause of stoppage which cannot or is not detected automatically. In the embodiment shown in FIG. 2, seven possible coded information signals can be sent to the computer on lines 128, 129 and 130 by rotating a three-pole eight-position switch 211 which is conventionally wired for octal to binary conversion to one of the eight possible positions. The three manual encoding lines 128, 129 and 130 are each connected to four of the positions on each individual switch 212, 213 and 214 as shown, so that in each different position to which the switch 211 can be rotated the wipers 215, 216 and 217 are connected or not connected to a different combination at lines 128, 129 and 130. Isolating diodes 220, 222 and 224 connect the switches 212, 213 and 214 to the appropriate lines 128, 129 and 130.

The information which has been encoded on switch 211 is then sent to the computer automatically when the loom restarts or manually closing a switch 230 which, for example, may be of the pushbutton type. Switch 230 may be designed so as to lockout loom electrical circuitry so that the operator must send stop information before the loom can be restarted. The closing of switch 230 connects the positive potential $V_{cc}$ to the input of the monostable multivibrator 146 so that the address of loom 132 is sent to the computer to 122 in the same manner as if the loom had just stopped or restarted. Since the voltage at the input of multivibrator 146 changes when the switch 230 is closed only when the loom is stopped, closing the switch while the loom is running has no effect since diode 244 prevents the voltage $V_{cc}$ from being connected to the input of gate 207. No accompanying signal on line 223 is received by the computer 122 so no possibility of interpreting the receipt of the address as a start exists.

The closing of switch 230 also connects the positive potential $V_{cc}$ to a logic gate 232, for example a NAND gate along with the output of monostable multivibrator 146 so that when an output pulse is produced on line 147, the output of NAND gate 232 on line 234 assumes a low potential, for example ground. The grounding of line 234 grounds the wipers 215, 216 and 217 and some or all of the lines 128, 129 and 130 depending on the position in which switch 211 is set so that an information signal is carried to the computer 122.

Similarly, the logic gate 232 responds to the starting of the loom by grounding line 234 and thereby sending the appropriate information signal down lines 128, 129 and 130. When the loom, in the embodiment shown in FIG. 2 starts, the output of loom sensor 140 shifts to a high-level triggering multivibrator 146 so that both inputs to logic gate 232 are high with the result that gate 232 grounds line 234. However, when the loom stops the level of the output of sensor 140 shifts to a low level to which gate 232 does not respond and no signals are sent down lines 128—130.

One three-pole switch can encode eight numbers, or seven if zero is omitted. If more information codes are desired three more wires connected to another three-pole switch can be added to provide a total of 64 numbers. More numbers can be made by adding additional wires and switches in the same manner.

The above embodiments are merely examples of the invention and many modifications and changes are possible without departing from the scope of the invention. The invention can be practiced with many other types of machines and is not intended to be limited to textile machines. Accordingly, the scope of the invention is limited only by the scope of the appended claims.

What I claim is:

1. A textile machine-condition-sensing system for conveying data on the condition of a given stopped textile machine from a plurality of condition-sensing devices associated with a plurality of textile stations, each said station being associated with a different textile machine, to recording means comprising:

a plurality of address lines connecting each said station to each other station and to said recording means for carrying coded address signals, each address signal representing a different textile station;

at least one return line for carrying electrical information signals relating to the cause of stoppage of a given machine from said stations to said recording means, encoding means associated with each said station for applying said address signal representing a given machine to said address lines, and logic means associated with each said station and electrically connected to said encoding means of that station and to said condition-sensing devices of that station for causing said encoding means to apply said address to said address lines when said given machine stops and for applying said information signals relating to the cause of stoppage of said given machine to said return line when said encoding means applies said address signal representing said station to said address lines.

2. A system as in claim 1 wherein said address is a binary number and each said address line carries a digit of that number.

3. A system as in claim 1 wherein said textile machine is a loom.

4. A system as in claim 3 including a first condition-sensing device associated with each said station for determining whether the loom associated with that station is running, a second condition-sensing device associated with each said station for determining whether a warp stop is occurring, a third condition-sensing device associated with each said station for determining whether a filling stop is occurring and a fourth condition-sensing device associated with each said station for determining whether a warp out stop is occurring.

5. A system as in claim 1 wherein said logic means causes said encoding means to apply said coded signal representing the address of said machine to said address lines when a given stopped machine starts.

6. A system as in claim 5 including a manual encoder associated with each said station for applying a coded signal to said address lines and wherein said logic means is electrically connected to said manual encoder for causing said manual encoder to apply said coded signal to said address lines after said encoding means applies said coded signal representing the address of said given machine to said address lines when said given stopped machine starts.

7. A system for conveying information relating to the condition of a textile machine from each textile machine to recording means comprising:
   a plurality of coding lines connecting each said machine to said recording means for carrying coded electrical information signals relating to the condition of said machines,
   a plurality of condition-sensing devices associated with said machines for producing electrical signals containing information on the machine conditions sensed, said plurality of devices including a trigger-condition-sensing device associated with each said machine for sensing a trigger condition and producing an electrical signal containing information on whether said trigger condition is present,
   encoding means associated with each said machine for applying a coded information signal to said coding lines and
   logic means associated with each given machine and electrically connected to said encoding means of that given machine and to said trigger-condition-sensing means of that given machine for causing said encoding means to apply said coded signal to said coding lines when said trigger-condition-sensing means of that machine senses that said trigger condition is present.

8. A system as in claim 7 wherein said trigger-condition-sensing device senses whether or not the machine with which it is associated is stopped.

9. A system as in claim 8 wherein said coded signal represents the address of the stopped machine.

10. A system as in claim 8 wherein said address is a binary number and said plurality of coding lines includes a plurality of address lines, each said address line carrying a digit of that binary number and wherein said plurality of coding lines includes a plurality of return lines, said return lines carrying information on the cause of stoppage of said machine.

11. A loom-condition-sensing system for conveying data on the condition of a given loom from a plurality of loom stations, each said station being associated with one of said plurality of looms to recording means comprising:
   a plurality of address lines connecting each station to each other station and to said recording means for carrying coded address signals, each address signal being identified with a different loom station,
   a loom-running sensor associated with each said loom station for sensing whether or not a loom is operating and for producing an electrical signal having a first state when the loom is operating and a second state when the loom is not operating,
   a plurality of other sensors associated with each said station for sensing the cause of loom stoppage and producing electrical signals containing information relating to the cause of said stoppage,
   encoding means associated with each said station for applying said coded address signals to said address lines,
   a plurality of return lines connecting each station to each other station and to said recording means for carrying electrical information signals relating to the cause of loom stoppage to said recording means,
   a manual encoder for applying a coded signal to said address lines, and
   logic means associated with each said station and electrically connected to said encoding means, said manual encoder, said loom-running sensor, and said other sensors for causing said encoding means to apply said address signal to said address lines when said given machine stops, for applying said information signals to said return lines when said encoding means applies said address to said address lines, for causing said encoding means to apply said coded signal representing the address of said machine to said address lines when said given machine starts, and for causing said manual encoder to apply said coded signal to said address lines after said encoding means applies said address signal to said address lines.

12. A system as in claim 11 wherein said other sensors include a filling stop sensor for sensing whether or not a filling stop is occurring, a warp stop sensor for sensing whether or not a warp stop is occurring and a warp out stop sensor for determining whether or not a warp out stop is occurring.